Jan. 31, 1961  D. M. PEMBERTON  2,969,974
SPRING BOOSTER DEVICE
Filed Nov. 19, 1958  2 Sheets-Sheet 1

INVENTOR.
DON M. PEMBERTON
BY
ATTORNEYS

Jan. 31, 1961   D. M. PEMBERTON   2,969,974
SPRING BOOSTER DEVICE
Filed Nov. 19, 1958   2 Sheets-Sheet 2

INVENTOR.
DON M. PEMBERTON

BY

ATTORNEYS

United States Patent Office 2,969,974
Patented Jan. 31, 1961

2,969,974
SPRING BOOSTER DEVICE

Don M. Pemberton, Lansing, Mich., assignor to Universal Air Lift, Inc., Lansing, Mich., a corporation of Michigan Filed Nov. 19, 1958, Ser. No. 774,986

10 Claims. (Cl. 267—23)

This invention relates to spring booster units for yieldably maintaining a pair of relatively movable members in spaced relation, and more particularly the invention pertains to a spring booster assembly comprising a pair of concentric coil springs having an elastic bag or envelope located within the inner spring and being inflatable so as to cause portions of the envelope to expand between the adjacent convolutions of the inner spring and reinforce its resistance to axial compression, the outer spring being so located that its convolutions act to control and reinforce the expanded portions of the envelope.

Apparatus constructed in accordance with the invention has been developed as a result of considerable research and experimentation to provide a spring booster device capable of supplementing the spring suspension system of an automobile, for example, in those instances when the normal load for which the suspension system was designed is exceeded, while being selectively capable of being so conditioned as to have no appreciable stiffening effect on the suspension system when the normal load is not exceeded. Ideally, a spring booster device should be capable of being completely disabled, that is, the device should offer no resistance of its own to the movement of a pair of spaced members towards one another, but also should be capable of adjustment so as to provide a wide range of resistances to oppose such movement of the members. In actual practice, all spring boosters have some stiffening effect on the vehicle suspension system, so it is desirable that the stiffening effect be reduced to a minimum.

It has been found that inflatable rubber or rubber-like bags positioned within a coil spring for axial compression function rather well as spring booster devices and it also has been found that the resistance of such a device in opposing movement of a pair of relatively movable members towards one another is directly proportional to the wall thickness of the bag. In other words, the thicker the wall of the bag, the greater the inherent resistance of the device to axial compression. The logical approach to decreasing the inherent resistance of the bag would be to reduce the wall thickness, but such action would naturally weaken the bag. Thus, it is possible that a thin-walled bag, inflated to compensate for an overload imposed on a vehicle, would be stressed beyond its endurance limit in the event the vehicle were driven over rough roads thereby causing additional compression of the inflating medium within the bag by axial compression of the bag. Moreover, merely reducing the thickness of the bag walls permits the bag to expand so rapidly that the bag's ability to increase the spring's resistance to deformation is impaired in those instances where it is desirable that the bag and its enclosing spring supplement the action of the suspension system with which the vehicle is equipped.

An object of this invention is to provide an improved spring booster device of the kind including an inflatable, elastic envelope enclosed with a coil spring and which is capable of being positioned between two relatively movable members to oppose their movement towards one another over a wide range of resistance values.

Another object of the invention is to provide a spring booster device of the type indicated in which the walls of the inflatable envelope are relatively thin so as to decrease the inherent resistance to deformation of the envelope.

A further object of the invention is to provide a spring booster device such as has been described and including means for reinforcing the walls of the inflatable envelope to protect them against rupture and to enable the device's resistance to axial depression to be increased rapidly.

Other objects and advantages of the invention will be pointed out specifically or will become apparent from the following description when it is considered in conjunction with the appended claims and the accompanying drawings, in which:

Figure 2:
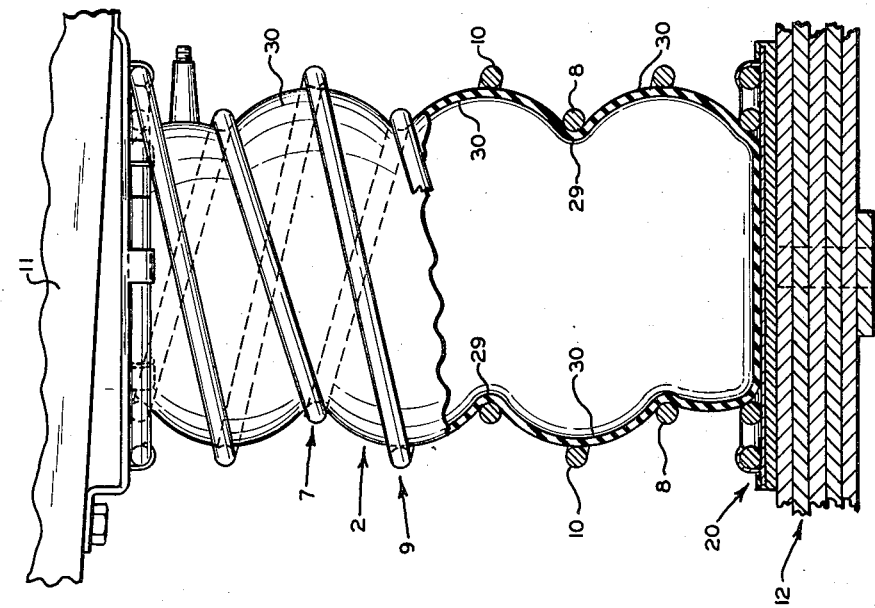
Figure 2 is a view partly in section and partly in side elevation similar to Figure 1, but showing the relationship of the parts when the envelope is inflated to a higher pressure.

A spring booster unit formed in accordance with the invention is represented in the drawings generally by the reference character 1 and comprises a hollow, air-tight, generally cylindrical bag or envelope 2 having spaced apart end walls 3 and 4 interconnected by elastic side walls 5. Near one end of the envelope 2 is provided a valve 6 of conventional construction communicating with the interior of the envelope to permit a fluid medium such as air to be admitted to or exhausted from the envelope to inflate or deflate the latter as desired.

Figure 1:
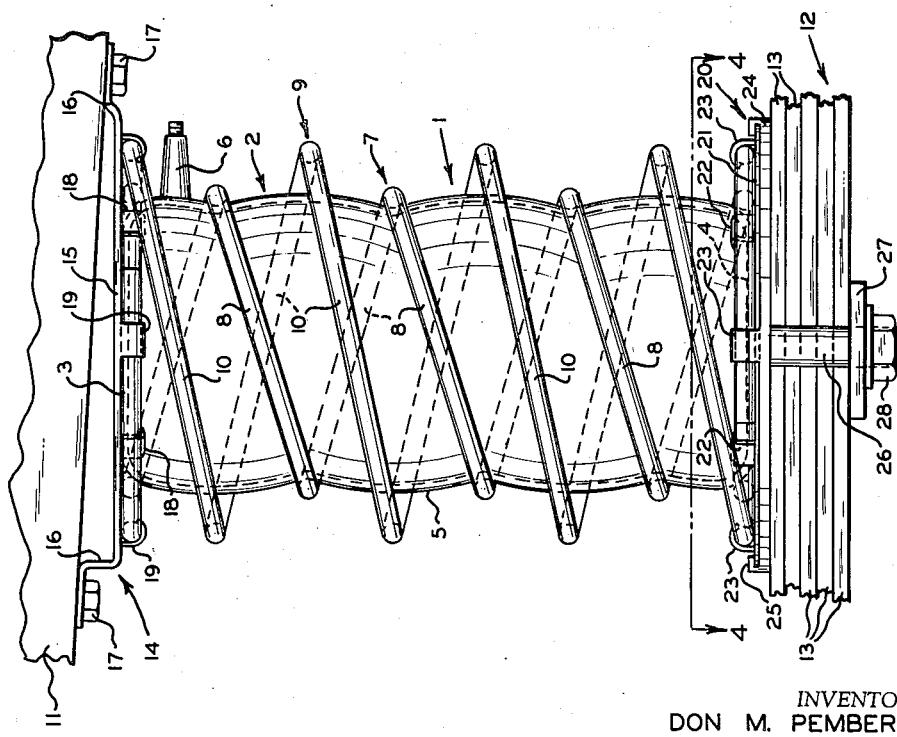
Figure 1 is a fragmentary, side elevational view of a spring booster device constructed in accordance with the invention and applied to a vehicle body and one of the vehicle springs, the envelope containing air at a pressure slightly above atmospheric.

Associated with the envelope 2 is a helical or coil spring 7, the individual convolutions 8 of which preferably are all of the same diameter and the diameter of the convolutions of the spring 7 preferably corresponds substantially to the diameter of the envelope 2 when the latter contains air at or substantially near atmospheric pressure so as to enable the envelope to be received within the convolutions of the spring 7 as is shown in Figure 1. Also associated with the envelope 2 is another coil or helical spring 9 and, again, the diameter of the individual convolutions 10 preferably is uniform, but greater than the diameter of the spring 7 so as to permit the springs 7 and 9 to be arranged concentrically with the spring 9 being spaced radially outwardly from the spring 7 as is shown in Figure 1.

The springs 7 and 9 preferably are of substantially equal length, but the convolutions of the respective springs are so arranged that the convolutions 10 of the spring 9 are located at points substantially midway between adjacent convolutions of the spring 7 for a purpose presently to be explained. The springs 7 and 9 are maintained in assembled relation by brackets at the upper and lower ends of the assembly. Various kinds of brackets may be used, depending on the particular apparatus to which the spring booster device is to be connected, so it should be understood that the disclosed brackets are merely representative of such devices generally.

In the disclosed embodiment of the invention, the spring booster unit 1 is shown as being installed between a portion of a vehicle frame or body member 11 and the rear wheel suspension spring 12 which may comprise a plurality of leaf springs 13 of conventional construction. At the upper end of the device 1 is a bracket 14 having a generally horizontal supporting plate 15 provided with extensions 16 adapted to be secured to the vehicle frame member 11 by suitable means such as bolts 17. The horizontal plate 15 may have a plurality of struck up fingers 18 arranged to overlie the end convolution of the spring 7 and clamp the latter to the bracket 14 and it also may include similar struck up fingers 19 arranged to overlie and clamp the endmost convolution of the spring 9 to the bracket 14.

At the lower end of the booster device 1 is a bracket 20 comprising a disk-like plate 21 having struck up fingers 22 and 23 arranged to overlie and clamp the endmost convolutions of the springs 7 and 9, respectively, to the plate 21 and the plate 21 may be secured to a base plate 24 by means of clamping dogs 25 bent over the peripheral edge of the plate 21. To the lower surface of the plate 24 may be welded or otherwise suitably secured a pair of spaced, threaded posts 26, the spacing between the posts 26 corresponding substantially to the width of the spring 12. Each of the posts 26 may receive a clamping bar 27 adapted to be clamped against the lower surface of the spring 12 by means of nuts 28 threaded on the post 26, and thereby receive the bracket 20 to the member 12.

To condition the apparatus for operation, the springs 7 and 9 are secured to their respective brackets 14 and 20 and the latter secured to the realtively movable members 11 and 12. Thereafter, the members 11 and 12 may be moved apart by means of a jack, for example, so as to stretch the springs 7 and 9. With the springs in stretched condition, the envelope 2, containing either substantially no air or air at substantially atmospheric pressure and with the valve open, may be inserted through the convolutions of the springs 7 and 9 so as to be received within the inner spring 7. Thereafter, the jack may be removed and the bag 1 may be inflated either to atmospheric pressure or higher so that portions of its side walls 5 engage the inner periphery of the convolutions of the spring 7.

As has been pointed out previously, the resistance to axial depression of the spring booster device 1 is directly proportional to the thickness of the side walls 5. The resistance to axial depression of the unit 1 also is proportional to the gauge of the wire forming the springs 7 and 9. For purposes of illustration, it will be assumed that the diameter of the wires forming each of the springs 7 and 9 is ¼ inch and that the thickness of the side wall 5 of the envelope 2 is ⅛ inch. It has been found that a spring booster unit having elements formed according to these dimensions may be mounted on a vehicle and, when the pressure of the fluid within the envelope 2 is atmospheric or only slightly above, the riding qualities of a vehicle are not noticeably affected by the inclusion of the spring booster device. These dimensions, however, are included herein only by way of illustration inasmuch as the booster elements may be made in varying dimensions for installation on vehicles of varying weight and function.

When the apparatus is installed and contains air at a pressure near or slightly above atmospheric, the assembly will present substantially the appearance shown in Figure 1 when the load on the vehicle suspension is normal. Under these conditions, portions of the external surface of the envelope side walls may be in engagement with the inner periphery of the convolutions of the coil spring 7, but both the envelope 2 and the spring 7 are entirely free from the convolutions of the spring 9. In this condition of the apparatus, the spring booster unit 1 will have no appreciable or noticeable effect on the riding qualities of the vehicle as it travels over a fairly smooth surface, but in the event the vehicle travels over a surface of such roughness that the members 11 and 12 move a substantial distance towards one another, the envelope 2 will be compressed between the members 11 and 12 and expanded radially as is indicated in Figure 2, so as to cause the side walls of the envelope 2 to assume a generally undulating configuration comprising roots 29 located at and receiving the convolutions of the spring 7 and radially projecting nodes 30 in those regions between the convolutions 8 which protrude between adjacent convolutions 8 and provide yieldable supporting areas for the individual convolutions 8 so as to reinforce the spring 7 and assist in resisting continued movement of the members 11 and 12 towards one another.

When a condition of overloading is anticipated or encountered, additional air may be introduced to the interior of the envelope 2 so as to cause the side walls of the envelope between the adjacent convolutions 8 to expand radially outwardly. Inasmuch as the wall thickness of the envelope 2 is relatively thin, the side walls expand readily and, if desired, sufficient air may be introduced into the envelope 2 to cause the portions 30 of the side wall 5 between adjacent convolutions 8 to expand radially outwardly into engagement with the convolutions 10 of the spring 8 when the vehicle is at rest. These conditions of the parts are shown in Figure 2.

When the envelope has been inflated to the extent shown in Figure 2, the springs 7 are more firmly supported by the nodes 30 of the envelope 2 and the protruding nodes of the envelope are restrained from further radial expansion at the points where they engage the convolutions 10 of the spring 9. In this condition of the device, the members 11 and 12 are restrained by the envelope against movement towards one another with considerably more force than is the case when the parts are in the condition shown in Figure 1. Accordingly, the vehicle is capable of carrying considerably more load without running the risk of "bottoming."

Figure 3:
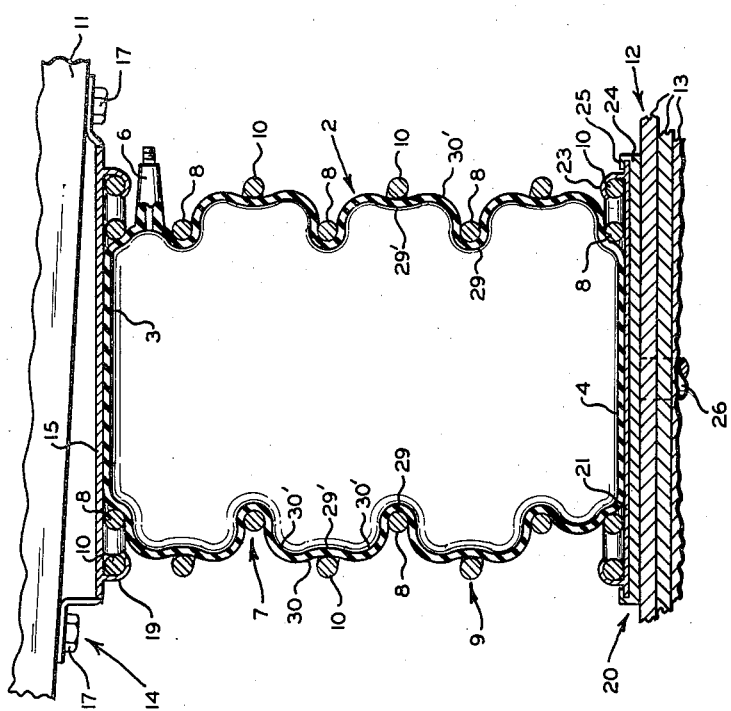
Figure 3 is a view similar to Figure 2, but showing the vehicle parts moved towards one another so as axially to compress the parts of the booster device.
Figure 4:
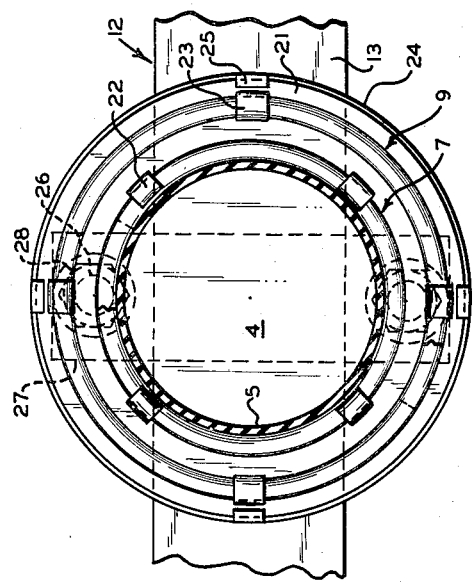
Figure 4 is a sectional view taken on the line 4—4 of Figure 1.

When a vehicle equipped with apparatus conditioned as illustrated in Figure 2 travels over a surface of sufficient roughness to cause relative movement of the members 11 and 12 towards one another, the envelope 2 is capable of further radial expansion so as yieldingly to resist movement of the members towards one another. The further radial expansion of the envelope occurs on opposite sides of the convolutions 10 as is indicated in Figure 3. In these conditions of the parts, the portions 30 of the side walls 5 bearing against the convolutions 10 may be considered secondary roots 29' and the protruding portions of the envelope on either side of the convolutions 10 may be considered secondary nodes 30' providing yielding supporting areas for the convolutions 10.

The presence of the convolutions 10 at a point substantially midway between adjacent convolutions 8 serves two functions; firstly, the convolutions 10 prevent the bellying out of the nodes 30 beyond a predetermined point and thereby minimize the possibility of rupture of the envelope; secondly, the convolutions 10, by restraining radial expansion of the nodes 30 beyond a predetermined point, reinforce the side walls 5 of the envelope and thereby enable higher pressures to be withstood by the envelope, which pressures are utilized in supporting not only the members 11 and 12, but also the individual convolutions of the springs 7 and 9. As a result, supporting pressures may be built up within the envelope 2 very quickly upon axial compression of the device 1 when it is in the condition shown in Figure 2 and the apparatus is capable of supporting considerable overloads. Nevertheless, the apparatus is capable of being so conditioned as to have no appreciable effect on the riding qualities of a vehicle having only normal loads imposed thereon.

The disclosed embodiment is representative of a presently preferred form of the invention, but is intended to be illustrative rather than definitive thereof. The invention is defined in the claims.

I claim:

1. Apparatus for yieldably maintaining a pair of spaced apart members in spaced relation comprising a first coil spring; a hollow envelope having spaced apart end walls and elastic side walls, said envelope being received within the convolutions of said first coil spring; means communicating with the interior of said envelope for inflating the latter with a compressible fluid to such an extent that the side walls of said envelope assume a generally undulating configuration comprising alternating roots and nodes, said roots receiving individual convolutions of said first coil spring and said nodes protruding a substantial distance between adjacent convolutions of said first coil spring to provide yieldable supporting areas for individual convolutions of said first coil spring; and a second coil spring larger than said first coil spring and receiving both said envelope and said first coil spring and having its convolutions located in positions to bear externally against said protruding nodes.

2. The apparatus set forth in claim 1 wherein the convolutions of said second coil spring are located substantially midway between adjacent convolutions of said first coil spring.

3. Apparatus for yieldably maintaining a pair of spaced apart members in spaced relation comprising a first coil spring; a hollow envelope having spaced apart end walls and elastic side walls, said envelope having a size corresponding substantially to the diameter of said first coil spring when said envelope contains fluid at substantially atmospheric pressure and said envelope being positioned within the convolutions of said first coil spring; means communicating with the interior of said envelope for inflating the latter with a compressible fluid to such pressure that the side walls of said envelope assume a generally undulating configuration comprising alternating roots and nodes, said roots receiving individual convolutions of said first coil spring and said nodes protruding a substantial distance between adjacent convolutions of said first coil spring to provide yieldable supporting areas for individual convolutions of said first coil spring; and a second coil spring of larger diameter than said first coil spring receiving both the envelope and said first coil spring but being spaced from the latter and having its convolutions located in positions to bear against said protruding nodes upon predetermined protrusion thereof.

4. The apparatus set forth in claim 2 wherein the convolutions of said second coil spring are located substantially midway between adjacent convolutions of said first coil spring.

5. Apparatus for yieldably maintaining a pair of relatively movable members in spaced apart relation comprising a hollow envelope having yieldable side walls and spaced apart end walls; a coil spring receiving said envelope and having a coil diameter corresponding substantially to the size of said envelope; means communicating with the interior of said envelope for permitting ingress and egress of air respectively to and from said envelope, said envelope being inflatable to such an extent that portions of said yieldable side walls protrude between adjacent convolutions of said coil spring; and yieldable means located radially outwardly of said coil spring and said envelope and receiving said coil spring but being so spaced from the latter as to be engaged by said protruding portions of said yieldable side walls.

6. The apparatus set forth in claim 5 wherein said yieldable means comprises a second coil spring having each of its convolutions located at a point substantially midway between adjacent convolutions of the first mentioned coil spring.

7. The combination with a pair of spaced apart, relatively movable members, of apparatus for yieldably maintaining said members in spaced relation, said apparatus comprising a first coil spring; means at opposite ends of said first coil spring connecting the latter to each of said members; a hollow envelope received within said first coil spring and having spaced end walls and elastic side walls; means communicating with the interior of said envelope for inflating the latter with a compressible fluid to such pressure that said side walls assume a generally undulating configuration comprising alternating roots and nodes, said roots receiving individual convolutions of said first coil spring and said nodes protruding a substantial distance between adjacent convolutions of said first coil spring; a second coil spring of larger diameter than said first coil spring and receiving both the latter and said envelope; and means at opposite ends of said second coil spring connecting the latter to each of said members, said second coil spring having its convolutions so positioned relative to the convolutions of said first coil spring as to bear against said protruding nodes upon predetermined protrusion thereof.

8. The combination set forth in claim 7 wherein the convolutions of said second coil spring are located substantially midway between adjacent convolutions of said first coil spring.

9. A spring booster assembly for yieldably maintaining a pair of relatively movable members in spaced relation comprising an envelope having elastic side walls; an axially yieldable coil spring element the convolutions of which have a diameter corresponding substantially to the size of said envelope at substantially atmospheric pressure, said envelope being positioned inwardly of the convolutions of said spring; an axially yieldable second coil spring element the convolutions of which have a diameter greater than the diameter of the convolutions of the first mentioned spring element, said first mentioned spring element and said envelope being positioned inwardly of the convolutions of said second spring element and the convolutions of said first mentioned spring element being located substantially midway between adjacent convolutions of said second spring element; means communicating with the interior of said envelope for inflating the latter to such an extent that portions of the side walls protrude between adjacent convolutions of said first mentioned spring element and bear against the convolutions of said second spring element; and means connected to opposite ends of said spring elements for maintaining the latter in assembled relation.

10. The assembly set forth in claim 9 including means on said maintaining means for connecting said assembly to said relatively movable members.

References Cited in the file of this patent

UNITED STATES PATENTS

| 1,361,001 | Blaisdell | Dec. 7, 1920 |
| 1,479,282 | Burns | Jan. 1, 1924 |
| 2,710,184 | Pemberton | June 7, 1955 |
| 2,878,012 | Crites | Mar. 17, 1959 |

FOREIGN PATENTS

| 825,642 | Germany | Dec. 20, 1951 |
| 1,160,501 | France | Mar. 3, 1958 |